United States Patent [19]

Suenaga et al.

[11] Patent Number: 5,396,639
[45] Date of Patent: Mar. 7, 1995

[54] ONE CHIP MICROCOMPUTER HAVING PROGRAMMABLE I/O TERMINALS PROGRAMMED ACCORDING TO DATA STORED IN NONVOLATILE MEMORY

[75] Inventors: Yoshiaki Suenaga; Shigemi Chimura; Hiroaki Masumoto, all of Kyoto, Japan

[73] Assignee: Rohm Co., Ltd., Kyoto, Japan

[21] Appl. No.: 760,391

[22] Filed: Sep. 16, 1991

[51] Int. Cl.$^6$ .................. G06F 15/78; G06F 1/24; G06F 3/00

[52] U.S. Cl. .................. 395/800; 395/700; 364/231; 364/232.8; 364/241.9; 364/927.92; 364/925.5; 364/925.6; 364/927.8; 364/965.76; 364/965.79; 364/DIG. 2

[58] Field of Search ............ 395/800, 425, 275, 700

[56] References Cited

U.S. PATENT DOCUMENTS 4,486,827  12/1984  Shima et al. .................. 395/725
5,088,023  2/1992  Nakamura et al. .............. 395/425

Primary Examiner—Thomas G. Black
Assistant Examiner—Paul Harrity
Attorney, Agent, or Firm—Fay, Sharpe, Beall, Fagan, Minnich & McKee

[57] ABSTRACT

A one-chip microcomputer according to the present invention is provided with an initial reset circuit for producing a first initial reset signal having a first reset period and a second initial reset signal having a second reset period which is longer than the first reset period, an access circuit for gaining access to an address in a nonvolatile memory such as a built-in ROM to read data therefrom, and I/O buffer circuits. A storage circuit and an I/O buffer connected to a programmable I/O terminal are provided in the I/O buffer circuit and a function of the I/O terminal with options is selected in conformity with the data set in the storage circuit. The data stored at a predetermined address in the nonvolatile memory is transferred to the storage circuit by operating the access circuit until the termination of the reset period of the second initial reset signal after the termination of the first reset period of the first initial reset signal. With this arrangement, as the contents of write data are altered by writing the data to the nonvolatile memory from the outside, an optional function of the programmable I/O terminal can be selected in accordance with the alteration.

13 Claims, 2 Drawing Sheets

ONE CHIP MICROCOMPUTER HAVING PROGRAMMABLE I/O TERMINALS PROGRAMMED ACCORDING TO DATA STORED IN NONVOLATILE MEMORY

BACKGROUND OF THE INVENTION

1. Technical Field

The present invention relates generally to one-chip microcomputers and more particularly to a one-chip microcomputer which a commercial product, and has either an input terminal or an output terminal (hereinafter called a selective function or programmable; 'I/O terminal') that allows the selection of an option of functions; namely, the functional selection of, for instance, a CMOS or open drain output state.

2. Background Art

One-chip microcomputers are widely used as control circuits in cameras, home electric appliances, and other kinds of electronic equipment. At the present stage, these are generally 4- or 8-bit one-chip microcomputers. A one-chip microcomputer of this sort is called a microcontroller and different in internal construction from a general purpose microprocessor in that RAM, ROM and the like, each having a fixed capacity, are connected to a bus and also contained in one chip.

The 4- or 8-bit one-chip microcomputer transmits and receives signals via either a input buffer or an output buffer (I/O buffer) to and from an external circuit. Like RAM, ROM and the like, the I/O buffer is also connected to the bus in the chip. These circuits thus connected to the bus are controlled by a processor (or a controller, these are collectively called a CPU in this specification).

In the case of such a one-chip microcomputer having ROM, an application program corresponding to the use of each circuit can be written to the ROM. Consequently, the ROM in the one-chip microcomputer of this sort is loaded with an application program after it has been manufactured as an LSI, depending on its use; that is, it is utilized as a one-chip microcomputer for the intended purpose. The one-chip microcomputer like this is often equipped with selective function that have I/O terminals functional selection of, for instance, a CMOS or open drain output state with respect to one I/O terminal (input or output terminal), the function of the I/O terminal being selectively set at a mask option.

A one-chip microcomputer of the type that has an application program writable to ROM, also allows the application program to be altered, and this arrangement can be utilized for the development of one-chip microcomputers and for various other uses. However, the selective function added to the I/O terminal is unchangeable after a selection is implemented at the mask option.

As a result, the change of the function added to the selective function I/O terminal has been dealt with only through the modification of an external circuit or the provision of an additional external circuit. When the one-chip microcomputer described above is used to develop a system, the fact that the function of the selective function I/O terminal is not simply changeable causes the efficiency of system development to decrease.

SUMMARY OF THE INVENTION

A one-chip microcomputer according to the present invention is characterized by an initial reset circuit for producing a first initial reset signal having a first reset period and a second initial reset signal having a second reset period which is longer than the first reset period, an access circuit for gaining access to an address in a nonvolatile memory such as a built-in ROM to read data therefrom, and I/O buffer circuits. A storage circuit and an I/O buffer connected to the selective function I/O terminal are provided in the I/O buffer circuit and a function of the selective function I/O terminal is selected in conformity with the data set in the storage circuit. The data stored at a predetermined address in the nonvolatile memory is transferred to the storage circuit by operating the access circuit until the termination of the reset period of the second initial reset signal after the termination of the reset period of the first initial reset signal.

In this way, the desired function of the selective function I/O terminal can be selected by gaining access to an address in the nonvolatile memory and transferring the data thus stored therein to the storage circuit during the period between the end of the first reset and the second and of the reset signal. In this case, the contents of write data can be altered by writing the data to the nonvolatile memory from the outside. The optional function of the selective function I/O terminal thus becomes determined in accordance with the alteration.

An object of the present invention is therefore to provide a one-chip microcomputer equipped with a selective function I/O terminal with one of plural functions imparted to the I/O terminal to be selectable to another function.

Another object of the present invention is to provide a one-chip microcomputer equipped with ROM and an I/O terminal with so-called option and designed for writing to the ROM one of the functions imparted to the I/O terminal. Still another object of the present invention is to provide a one-chip microcomputer equipped with a selective function I/O terminal which renders possible an efficient one-chip microcomputer system development.

DESCRIPTION OF THE PREFERRED EMBODIMENT

Figure 1:
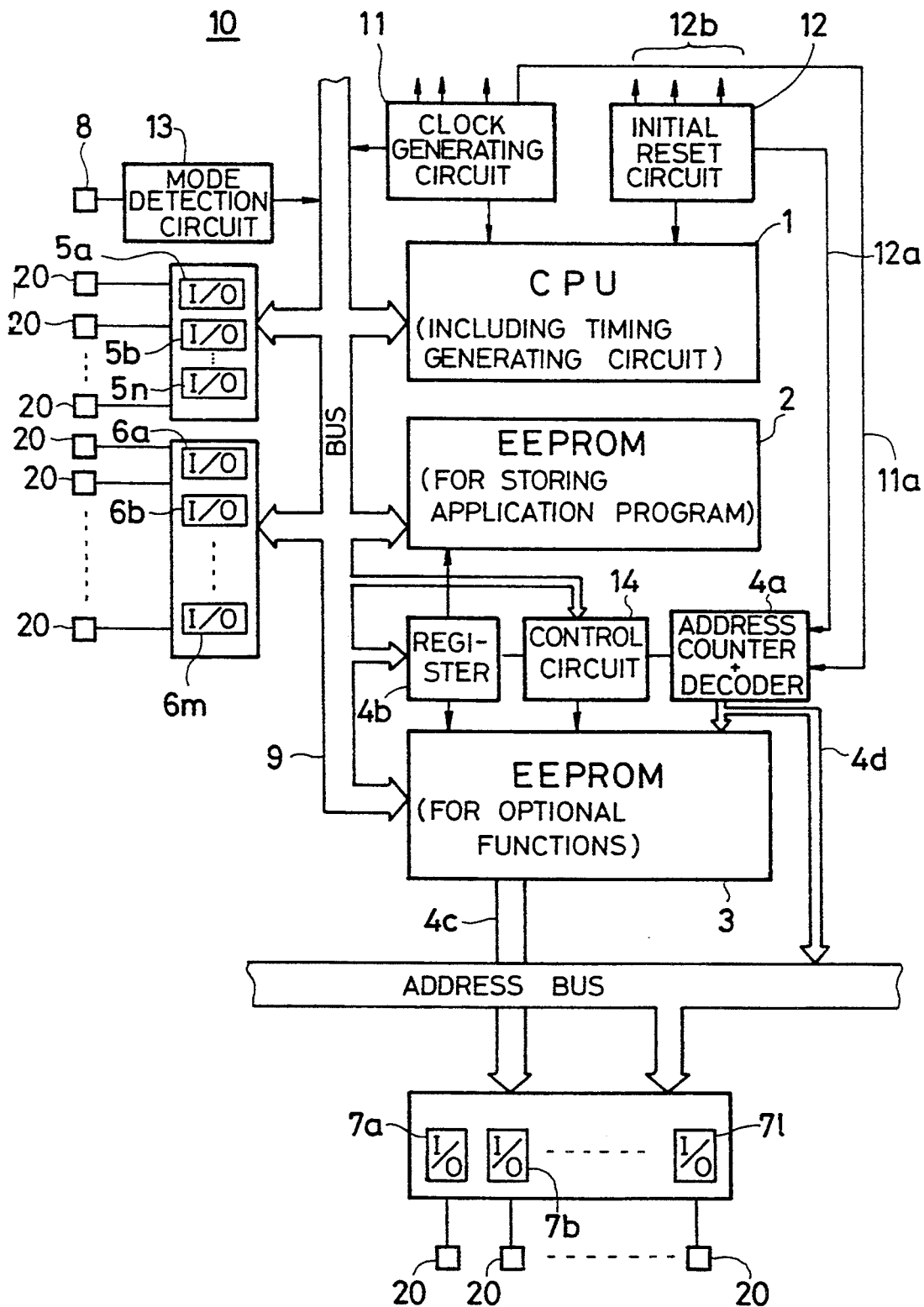
FIG. 1 is a block diagram of a one-chip microcomputer embodying the present invention.

As shown in FIG. 1, a one-chip microcomputer 10 comprises a CPU 1 including a timing generating circuit, an EEPROM 2 for storing an application program, an EEPROM 3 for storing function- selecting data on selecting one of the functions for an I/O terminal, an address counter 4a for gaining access to the EEPROM 2 and the EEPROM 3, a register 4b for temporarily storing data to be written to the EEPROM 2 and the EEPROM 3, I/O buffer circuits (hereinafter called 'I/O') 5a, 5b, . . . , 5n, I/O buffer circuits (hereinafter called 'I/O') 6a, 6b, . . . , 6m, I/O buffer circuits (hereinafter called 'I/O') 7a, 7b, . . . ,7l connected to respective selective function I/O terminals 20 with signal selectable option, and a mode setting terminal 8. These circuits are mutually connected via a bus 9. The EEPROM 3 selectively adds one of the optional functions prepared beforehand to the I/O 7a, 7b, ..., 71 in conformity with the contents of the data stored therein. The EEPROM 3 for storing data on adding the optional function is also connected to the I/O 7a, 7b, ... 71 connected to the I/O terminals with option by means of a data line 4c and an address bus 4d other than the bus 9 (in this case, the address bus of the bus 9 may be used instead).

A clock generating circuit 11 supplies a clock signal 10 to each circuit of the one-chip microcomputer including the CPU 1 and a clock signal (as designated by 11a) to the address counter+decoder 4a (hereinafter referred to as the address counter 4a including the decoder). When the one-chip microcomputer 10 is supplied with power (i.e., it is turned "on"), the address counter 4a thereby start to operate after the initial set is released.

An initial reset circuit 12 is different from an ordinary one in that the former has a counter therein and when a power supply is turned "on", it produces two kinds of reset signals having different reset periods. A first reset signal 12a remains at a low level (hereinafter called "L") after the power supply is turned "on", resets the address counter 4a and the like, and then releases them from resetting for a predetermined first reset period after the power supply is turned "on." During this first reset period, the supply voltage of the one-chip microcomputer 10 reaches the level at which each circuit can operate and approximately 1,024 clock pulses, for instance, from the clock generating circuit 11 are counted after the power supply is turned "on." During this first reset period of 1,024 clock pulses, the signal 12a first stays at "L" and then at the end of the first reset period reaches a high level (hereinafter "H") at which the reset is released. The circuit for producing the first reset signal consists of a counter in addition to a reset circuit using an ordinary capacitor (C) and a resistor (R).

A second reset signal 12b remains at "L" after the power supply is turned "on" and its level changes from "L" to "H" when 1,024 clock pulses, for instance, are counted further after the first reset signal 12a reaches "H" at which time the second reset is released. The CPU 1 and the circuits directly associated therewith are reset by the second reset signal. The CPU 1 is released from resetting after the second reset period during which the count operation of 2,048 clock pulses from power on is performed and set the CPU is thereby to operate. Simultaneously, various circuits associated with the CPU 1 are also released from resetting. The circuit for producing the second reset signal is formed with a counter, for instance.

With the provision of the initial reset circuit 12 for producing two kinds of reset signals having a long and a short period, respectively, the address counter 4a is released from resetting before the other circuits in the one-chip microcomputer 10 and the address counter 4a is set to operate. The address counter 4a receives the clock signal 11a until the second reset signal is released and produces addresses from 0 up to 1,023. In other words, the address counter 4a is incremented consecutively by the clock 11a until the second reset signal 12b reaches "H" after the first reset signal 12a attains "H" (i.e., 12a=H, 12b=L). The EEPROM 3 is kept in the read state during this second half of the second reset period (12a=H, 12b=L) and data are read from addresses in the EEPROM 3 corresponding to the respective address values of the address counter 4a. The data thus read are successively transferred via the data line 4c to the I/O 7a, 7b, ... 71 connected to the selective function I/O terminal. The supply voltage of the one-chip microcomputer has already reached the level at which the EEPROM and the I/O operate during the first reset period. In other words, the first reset period during which the first reset signal is produced extends up to the time when each of the circuits such as the EEPROM 3, the I/O 7a, 7b, ... 71 and the like involved in the data transfer above attains at least supply voltage for its operation.

A mode detection circuit 13 is connected to the mode setting terminal 8 and used for setting the one-chip microcomputer 10 to various modes by detecting the voltage applied to the mode setting terminal 8. The modes that can be set include a normal operating mode applicable when voltage ranging from 0 V–2V is applied to the terminal, a bus monitor mode applicable when voltage from above 2 V up to 3 V is applied thereto, a test mode in which external data is received and the CPU 1 is controlled correspondingly when voltage from above 3 V up to 5 V is applied thereto, and an EEPROM write mode in which data is writable to the EEPROMs 2 and 3 when voltage from above 5 V up to 7 V is applied thereto.

Incidentally, the I/O 5a, 5b, ..., 5n are circuits mainly composed of the respective I/O buffers and, though the I/O normally operates as the I/O buffer, it operates as an output circuit for monitoring timing in the test mode and the EEPROM data write mode. The I/O 6a, 6b, ..., 6m are also circuits mainly composed of the respective I/O buffers and, though the I/O normally operates as the I/O buffer, it becomes a data input circuit when program data and various data are written to the EEPROMs 2 and 3 in the test mode and the EEPROM write mode. A circuit for storing data such as a latch circuit and the like is contained in each of the I/O, including the I/O 7a, 7b, ..., 71.

The bus 9 consists of a data bus, an address bus and a control bus and the CPU 1 contains ROM and RAM. The I/O buffer of each I/O is connected to an I/O terminal 20.

Figure 2:
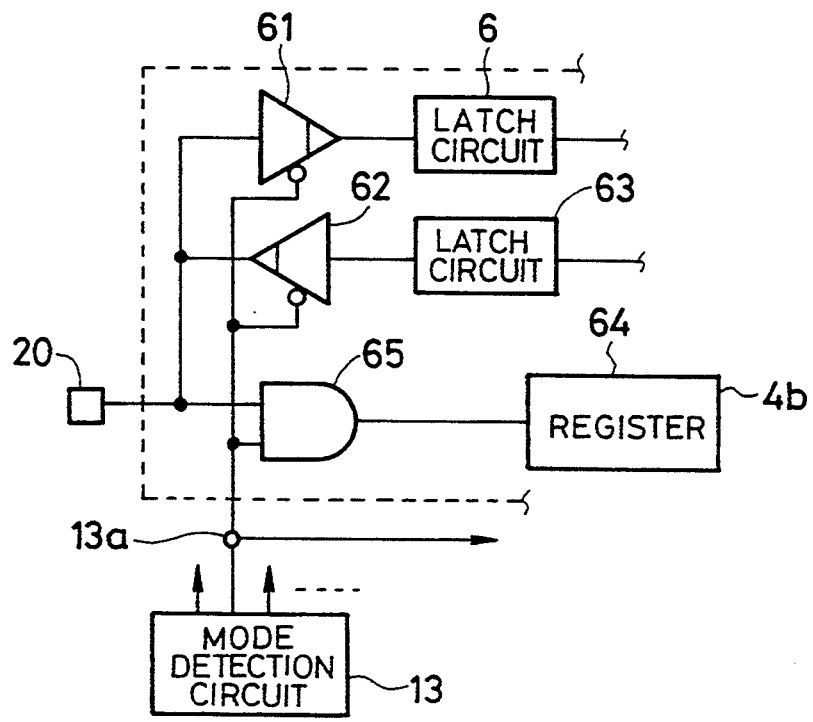
FIG. 2 is a diagram illustrating the relation of an optional EEPROM to an I/O buffer circuit.

FIG. 2 is a diagram illustrating the relation of the mode detection circuit 13 to the I/O 6a, 6b, ..., 6m. As the I/O 6a, 6b, ..., 6m are similar in construction to one another, the I/O is shown as I/O6. The 1/06 has an input buffer 61, an output buffer 62, latch circuits 63 and 64, a two-input gate circuit 65 and the like. The one side inputs of the input buffer 61, the output buffer 62 and the gate circuit 65 are connected to the I/O terminal 20, respectively.

When the mode detection circuit 13 detects the EEPROM write mode, an "H" signal is produced at its output terminal 13a. This output is applied to the other side input of the gate circuit 65 and simultaneously supplied to the input buffer 61 and the output buffer 62 as a disable signal. The operation of the input buffer 61 and the output buffer 62 is thereby halted. Then the gate circuit 65 is opened to let the signal of the I/O terminal 20 pass therethrough and to transmit the signal to the register 4b for storing write data with respect to the address counter 4a, the EEPROMs 2 and 3. This signal is supplied to the storage digit position of the register 4b so provided as to correspond to the digit position of the I/O terminal 20. Consequently, the register 4b receives and stores the signal as 1-bit data. When the predetermined data is stored in the register 4b, it becomes transferable to the address counter 4a, the EEPROMs 2 and 3.

First, an input voltage of 3 V–5 V is applied to the input of the mode detection circuit 13 and the CPU 1 is controlled from the outside to set an EEPROM write flag "1" among those of the state register provided inside a control circuit 14. When the flag is switched to "1", the value of the address counter 4a can be set from the outside via the I/O 6a, 6b, . . . , 6m. A write address is then set in the address counter 4a. Subsequently, data can be written at an address in the EEPROM 2 or 3 as designated by the address counter via the I/O 6a, 6b, . . . , 6m. A series of operations described above is repeated so that data may be written to the EEPROM 2 or 3 from the outside. When the data is thus written, the set value in the address counter 4a may be sequentially incremented under control from the outside.

The control circuit 14 has been adapted for use as a state setting circuit for setting the inner part of the one-chip microcomputer 10 to various states and has a state register for choosing either EEPROM 2 or 3. Therefore, a voltage higher than 5 V up to 7 V is applied to the mode setting terminal 8 when the EEPROMs 2 and 3 are loaded with a program and data. Then data is written at the predetermined address in the EEPROMs 2 and 3 from the outside. In this case, the timing at which data is written should conform to the clock generation while the bus 9 is monitored.

Incidentally, the EEPROMs 2 and 3 are disposed in a space entirely different from the address space formed in the bus 9 or what the CPU 1 connected to the bus 9 can access. Therefore, the selection of the EEPROM 2 or 3 is made by, for instance, applying 3–5 V to the mode detection circuit 13 to set a mode in which the CPU 1 is controlled from the outside and then by setting data or a flag in the state register provided in the control circuit 14. The CPU 1 is used to set an address in the EEPROM 2. As an address space available in the EEPROM 3 ranges from "0" to "1,023" when the two reset signals are taken into consideration, setting the address is carried out by setting a numeric value to the address counter 4a from the outside as described above. Consequently, 1-bit data is stored at each address.

Figure 3:
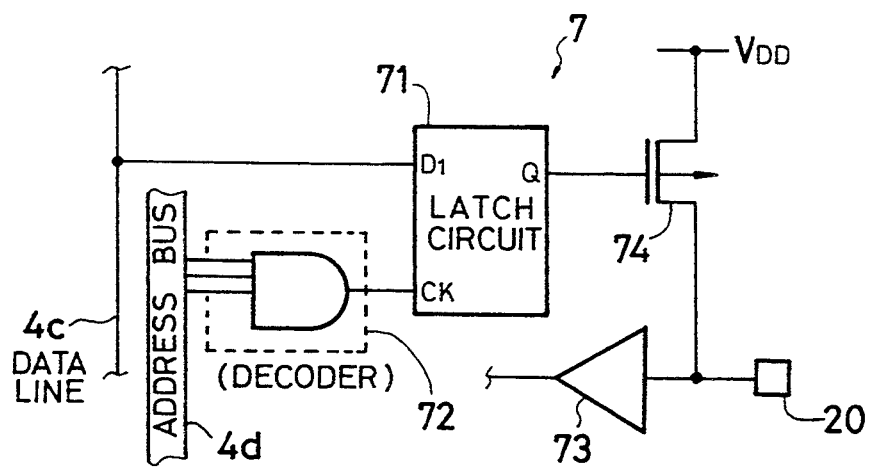
FIG. 3 is a diagram illustrating the internal construction of an I/O buffer circuit of an optional input-output terminal.

FIG. 3 is a diagram illustrating the construction of an I/O7 as what represents the I/O 7a, 7b, . . . , 71. The I/O7, which is an input buffer, comprises a latch circuit 71 connected to the data line 4c, an address decoder 72 connected to the address bus 4d, an input circuit (input buffer) 73, a pull-up transistor 74 and the like. In the case of the output buffer circuit, the input circuit 73 is replaced with an output circuit (output buffer), though the other components are invariable.

In this case, data "1" or "0" is set in the latch circuit 71, whereby the transistor 74 is turned "off" when it is "1" and the input circuit 73 operates as an input circuit without pull-up resistance, whereas the transistor 74 is turned "on" when it is "0" and operates as a circuit with pull-up resistance. VDD in FIG. 3 represents a power supply line.

In this circuit arrangement shown as an example, one of the two optional functions can be chosen when the 1-bit data is set in the latch circuit 7. Moreover, it is also possible to utilize the like circuit for choosing between an open drain circuit and an invertor circuit as the output circuit. In addition, a decision can readily be made on choosing not only a pull-up circuit but also a pull-down circuit. These cases can easily be implemented by designing the I/O circuit for the intended purpose. Therefore, various optional functions may be added to the I/O terminal connected to the I/O7.

A description will be given of the overall operation of the one-chip microcomputer 10.

The data write operation will be described with reference to the EEPROM 3 first. When a signal of voltage exceeding 5 V up to 7 V is supplied to the mode setting terminal 8, the one-chip microcomputer 10 is set in the EEPROM write mode.

Data then becomes writable to the EEPROMs 2 and via the I/O 6a, 6b, . . . , 6m. As an address space available in the EEPROM 3 ranges from "0" to "1,023", the data to be set is stored in the latch circuits 71 of the respective I/O 7a, 7b, . . . , 71. In this case, the data stored at each address of the EEPROM 3 is 1-bit to be latched by the latch circuit 71 at an address position where the address value conforms to an decoding address in the address decoder 72; namely, it is "1" or "0."

When data on the data to select one of the optional functions is stored in EEPROM 3 and when data on a necessary application program is stored in the EEPROM 2, a voltage 0 V–2 V is applied to the input of the mode detection circuit 13 of the one-chip microcomputer 10, whereby the one-chip microcomputer 10 is set in the normal operating mode.

When the power supply of the one-chip microcomputer 10 is turned "on" and set in the operating state, the reset circuit 12 first operates. In this case, the first reset signal 12a changes from "L" to "H" at the timing at which the clock signal is counted up to approximately "1,023." As a result, the address counter 4a is released from resetting.

The address counter 4a is sequentially incremented in response to the clock signal 11a from the clock generating circuit 11 at that timing after the counter value exceeds "1,023." At each address thus incremented, the address counter 4a gains access to the address in the EEPROM 3. Then the data from the EEPROM 3 is read via the data line 4c and the data thus read is transmitted to each I/O 7a, 7b, . . . , 71. In each I/O7, the address signal (the value of the address counter 4a) is decoded when the address for decoding the address decoder 72 is fed to the address bus 4d and the data supplied from the EEPROM 3 is set in the latch circuit 71 when the decoding signal is produced simultaneously with the self address is accessed.

In this manner, the data for use in setting the optional function is successively stored in the I/O from a point of time the clock signal thus generated is counted as "1,024" until the second reset signal 12b changes from "L" to "H", when the counted value of the clock signal thus counted becomes "2,048" (=1,024+1,024) in value. The internal circuit of the one-chip microcomputer 10 is released from resetting and the one-chip microcomputer 10 returns to the normal operation. The data on selecting one of the optional functions, "1" or "0", has already , been set in the latch circuit 71 of each I/O 7a, 7b, . . . , 71 in accordance with the data stored in the EEPROM 3 by then. As a result, function of the I/O terminal with option to be connected to the I/O buffer becomes what corresponds to the optional function involved.

When it is desired to alter the contents of each latch circuit 71 of I/O 7a, 7b, . . . , the signal of the voltage exceeding 5 V up to 7 V is applied to the mode setting terminal 8 and the data in the EEPROM 3 is altered by adapting it to the EEPROM write mode. Another optional function can thus readily be selected and set.

In this manner, an optional function with respect to the I/O terminal with option (its I/O) may freely be set after manufacture simultaneously with the alteration of the application program. In other words, the I/O terminal may be provided with a function corresponding to the option thus intended.

Although it has been arranged that a plurality of I/O terminals with option (I/O connected thereto) are set in this embodiment as set forth above, there may be provided only one I/O terminal. Although there has been provided the EEPROM for storing the application program, moreover, such an EEPROM can be dispensed with. Further, the memory for storing the data on selecting one of the optional functions is not limited to the EEPROM. Such a memory is only necessary to be provided in the one-chip microcomputer as a nonvolatile memory which can be rewrited from the outside. In addition, the memory is of any kind and data writing may be executed, depending on the kind of the memory.

Although the 1-bit storage memory has been employed as the EEPROM 3 for appending an option to the I/O terminal with option in the embodiment shown, it may be adapted for storing several bits. Further, such a memory may be adapted for use in storing 8 bits at one address and the data may be transferred simultaneously to each I/O connected to an I/O terminal with eight option in 8 bit parallel.

Although the EEPROM 3 is disposed at "0"-"1,023" out of the address space indicated by the address counter 4a in the embodiment shown, it may be arranged in any space as the address space is changeable in the decoder circuit. The number of address spaces to be assigned is only necessary to be that of data to be transferred to I/O or greater than the latter. In other words, the period between the ends of the first and second initial reset periods of the first initial reset single and the second initial reset signal may be determined correspondingly.

While a preferred embodiment has been set forth with specific details, further embodiments, modifications and variations are contemplated according to the broader aspects of the present invention, all as determined by the spirit and scope of the following claims.

We claim:

1. A one-chip microcomputer, comprising:
   a bus;
   a built-in processor coupled to said bus;
   a built-in nonvolatile memory for storing data and being coupled to said bus to be rewritten with data;
   a programmable I/O terminal coupled to said bus and having different selectable functions;
   an initial reset circuit for producing a first initial reset signal having a first reset period and a second initial reset signal having a second reset period which is longer than the first reset period, so that the first reset period is coextensive with a first part of and starts simultaneously with the second reset period;
   an access circuit for gaining access to an address in said nonvolatile memory to read the data therefrom onto said bus;
   said programmable I/O terminal including an external terminal, a buffer circuit having a storage circuit connected to said access circuit to temporarily store the data and a buffer connected to said external terminal;
   means for selecting a function of said programmable I/O terminal in conformity with the data in said storage circuit;
   means for transferring data stored at the address in said nonvolatile memory to said storage circuit by operating said access circuit until the termination of the second reset period of the second initial reset signal and after the termination of the first reset period of the first initial reset signal;
   means operating during the first reset period of the first initial reset signal for setting a supply voltage to a level at which said processor, said nonvolatile memory, said storage circuit and said access circuit are operating; and
   means for preventing the processor from resetting until after the termination of the second reset period of the second initial reset signal.

2. A one-chip microcomputer as claimed in claim 1, further including means for counting clock signals to determine points of time when the first and second reset periods of the first and the second initial reset signals are terminated.

3. A one-chip microcomputer as claimed in claim 2, further including a mode setting circuit for setting said nonvolatile memory in a write state from the outside of the one-chip microcomputer for receiving data on selecting one of the functions for said programmable I/O terminal.

4. A one-chip microcomputer as claimed in claim 3, wherein said nonvolatile memory is an EEPROM and wherein said access circuit has an address counter for gaining access to said EEPROM.

5. A one-chip microcomputer as claimed in claim 4, wherein a plurality of said programmable I/O terminals are provided, and a plurality of said buffer circuits are provided and connected to respective ones of said programmable I/O terminals.

6. A one-chip microcomputer as claimed in claim 5, wherein said EEPROM is employed as a first EEPROM; and further including
   a second EEPROM to store an application program, wherein said first EEPROM and said second EEPROM are separately assigned to respective address spaces and accessible by the processor, and wherein data on selecting one of the functions is stored at an initial address in said first EEPROM.

7. A one-chip microcomputer as claimed in claim 6, wherein said first EEPROM stores 1-bit data at each address and wherein each of said addresses correspond to a respective buffer, and wherein said means for transferring transfers 1-bit of the data to each of said storage circuits of respective ones of said buffer circuits corresponding to respective ones of said addresses.

8. A one-chip microcomputer as claimed in claim 7, wherein each of said buffer circuits has a transistor connected to one of said programmable I/O terminals and a power supply line, and wherein said transistor is turned "on-off" in conformity with the data stored in said storage circuit and acts as a pull-up resistor while in the "on" state.

9. A one-chip microcomputer as claimed in claim 8, wherein said buffer circuits and said programmable I/O terminals input or output respectively.

10. A one-chip microcontroller, comprising:
    an internal bus having data, control and address lines;
    a plurality of external terminals;
    a plurality of programmable I/O terminals coupled between said external terminals and said internal bus;
    a processor, including RAM and ROM, connected to said internal bus;

a nonvolatile PROM for storing data and being coupled to said internal bus to be rewritten with data from the internal bus when the microcontroller is in a PROM write mode;

an initial reset circuit responsive to power-on in a normal operation mode of the microcontroller for producing a first signal for a first period of time and thereafter producing a second signal for a second period of time;

a mode detection circuit for selectively operating the microcontroller in the normal operation mode or the PROM write mode;

said programmable I/O terminals each selecting one of a plurality of different functions in accordance with data received from said nonvolatile PROM;

an access control circuit for controlling transfer of data from said nonvolatile PROM to said programmable I/O terminals;

means responsive to said first signal for providing operating voltage to said nonvolatile PROM, said programmable I/O terminals, and said access control circuit during the first period of time;

said access control circuit transferring the data from said nonvolatile PROM to said programmable I/O terminals during the second period of time, the transferring being in response to the second signal, and the transferring being for programming said programmable I/O terminals; and said processor being responsive to the first and second signals for remaining inoperable during the first and second periods of time and being responsive to termination of the second period of time for becoming operable.

11. The microcontroller of claim 10, wherein each of said programmable I/O terminals includes a buffer coupled between a respective one of said external terminals and said internal bus, function select circuit responsive to a select signal for changing a function of the programmable I/O terminal, a storage circuit connected between the internal bus and said function select circuit for storing a corresponding one bit of the data when enabled, and an address decoder connected between said storage circuit and said internal bus for enabling the storage circuit.

12. The microcontroller of claim 11, wherein each of said programmable I/O terminals has a unique address corresponding to an address of said nonvolatile PROM memory; and further including an address counter responsive to output of said initial reset circuit, for initializing to a predetermined address at the beginning of the second period of time, incrementing continuously from said predetermined address during the second period of time, and for placing on the internal bus successive addresses of said nonvolatile PROM memory and said programmable I/O terminals.

13. The microcontroller of claim 10, wherein each of said programmable I/O terminals has a unique address corresponding to an address of said nonvolatile PROM; and further including an address counter responsive to output of said initial reset circuit, for initializing to a predetermined address at the beginning of the second period of time, incrementing continuously from said predetermined address during the second period of time, and for placing on the internal bus successive addresses of said nonvolatile PROM memory and said programmable I/O terminals.

* * * * *